United States Patent
Anderson et al.

(10) Patent No.: US 10,654,086 B2
(45) Date of Patent: May 19, 2020

(54) TENSIONING DEVICE FOR A SHEET OF MATERIAL

(71) Applicants: Ryan Bruce Anderson, Great Mills, MD (US); Bradley Yost, Lexington Park, MD (US); Matthew Stone, Lexington Park, MD (US); Tiffany Lei, La Plata, MD (US)

(72) Inventors: Ryan Bruce Anderson, Great Mills, MD (US); Bradley Yost, Lexington Park, MD (US); Matthew Stone, Lexington Park, MD (US); Tiffany Lei, La Plata, MD (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 280 days.

(21) Appl. No.: 15/949,549

(22) Filed: Apr. 10, 2018

(65) Prior Publication Data

US 2019/0308235 A1    Oct. 10, 2019

(51) Int. Cl.
| | |
|---|---|
| *B21D 11/02* | (2006.01) |
| *F16H 25/20* | (2006.01) |
| *B29C 55/16* | (2006.01) |
| *B21D 25/02* | (2006.01) |
| *B21D 25/04* | (2006.01) |

(52) U.S. Cl.
CPC .............. *B21D 11/02* (2013.01); *B21D 25/02* (2013.01); *B21D 25/04* (2013.01); *B29C 55/165* (2013.01); *F16H 25/20* (2013.01)

(58) Field of Classification Search
CPC ........ B21D 11/02; B21D 25/00; B21D 25/02; B21D 25/04; B29C 55/16; B29C 55/165; B44D 3/185; D05C 1/04; B01D 67/0027; B65H 2511/172
See application file for complete search history.

(56) References Cited

U.S. PATENT DOCUMENTS 4,644,626 A * 2/1987 Barnes .................. B21D 25/02
                                                            29/421.1

FOREIGN PATENT DOCUMENTS

DE            347655 C  *  1/1922   ............... D05C 1/04

OTHER PUBLICATIONS

Translation of DE 347,655 ("Adamus") (Year: 1922).*

* cited by examiner

*Primary Examiner* — Xiao S Zhao
*Assistant Examiner* — John J Derusso
(74) *Attorney, Agent, or Firm* — Mark O. Glut; NAWCAD

(57) ABSTRACT

A tensioning device for a sheet of material that includes a first ring with protrusions, a second ring, and a shaft. The first ring and the second ring are positioned such that the sheet of material can be clamped between the first ring and the second ring. The shaft has an outer surface, the outer surface includes a spiral race such that the protrusions of the first ring follow the spiral race, allowing the first ring and the second ring to displace linearly causing the sheet of material to be stretched. The spiral race includes a plurality of notches that correspond to the protrusions.

2 Claims, 2 Drawing Sheets

TENSIONING DEVICE FOR A SHEET OF MATERIAL

STATEMENT OF GOVERNMENT INTEREST

The invention described herein may be manufactured and used by or for the Government of the United States of America for governmental purposes without payment of any royalties thereon or therefor.

BACKGROUND

In certain applications, a sheet of a material, particularly a membrane type acoustic metamaterial, must be stretched in a radial direction. Currently, heat stretching and use of an oven with thermoset adhesive is utilized. This method requires an oven and utilizing high temperatures, and is very time consuming. Therefore, there is a need for a tensioning device for a sheet of material that does not utilize heat or an oven, is quick, and allows uniform radial tensioning.

SUMMARY

The present invention is directed to a tensioning device for a sheet of material that includes a first ring with protrusions, a second ring, and a shaft. The first ring and the second ring are positioned such that the sheet of material can be clamped between the first ring and the second ring. The shaft has an outer surface, which includes spiral races such that the protrusions of the first ring follow the spiral races, allowing the first ring and the second ring to displace linearly causing the sheet of material to be stretched. The spiral race includes a plurality of notches that correspond to the protrusions.

The present invention is directed to a tensioning device for a sheet of material that does not use heat and/or an oven, and a device that uniformly stretches a material in a radial direction.

It is a feature of the present invention to provide a tensioning device for a sheet of material that allows the ability to stretch membrane acoustic metamaterials quickly and without use of an oven or the like.

DRAWINGS

These and other features, aspects and advantages of the present invention will become better understood with reference to the following description and appended claims, and accompanying drawings wherein:

DESCRIPTION

Figure 1:
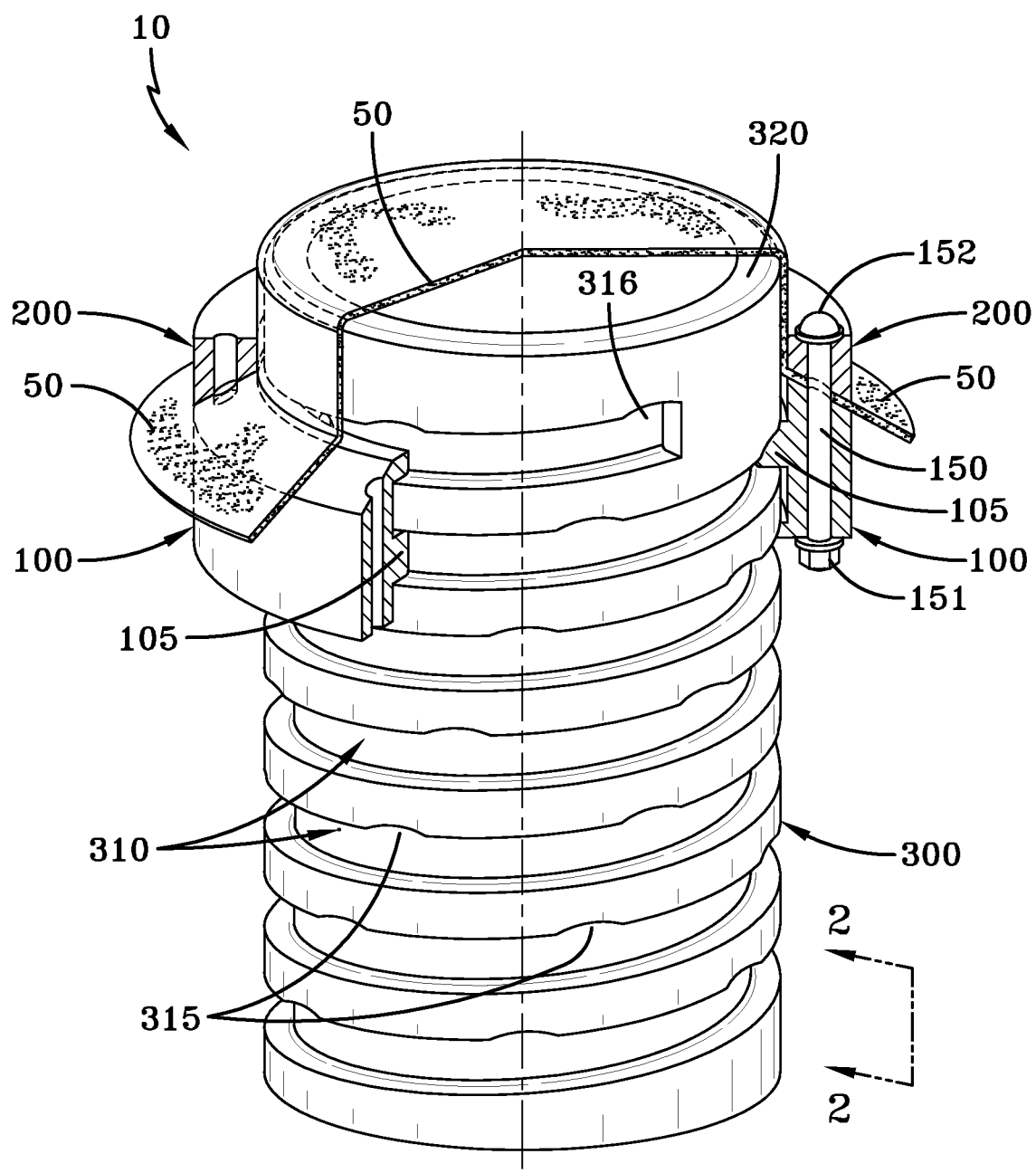
FIG. 1 is a perspective view of an embodiment of the tensioning device for a sheet of material.
Figure 2:
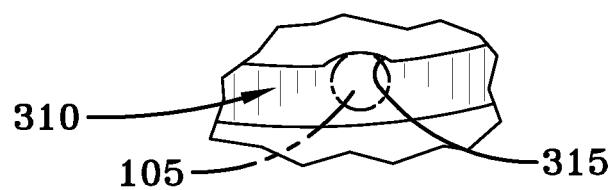
FIG. 2 is a view of a spiral race with a notch.
Figure 3:
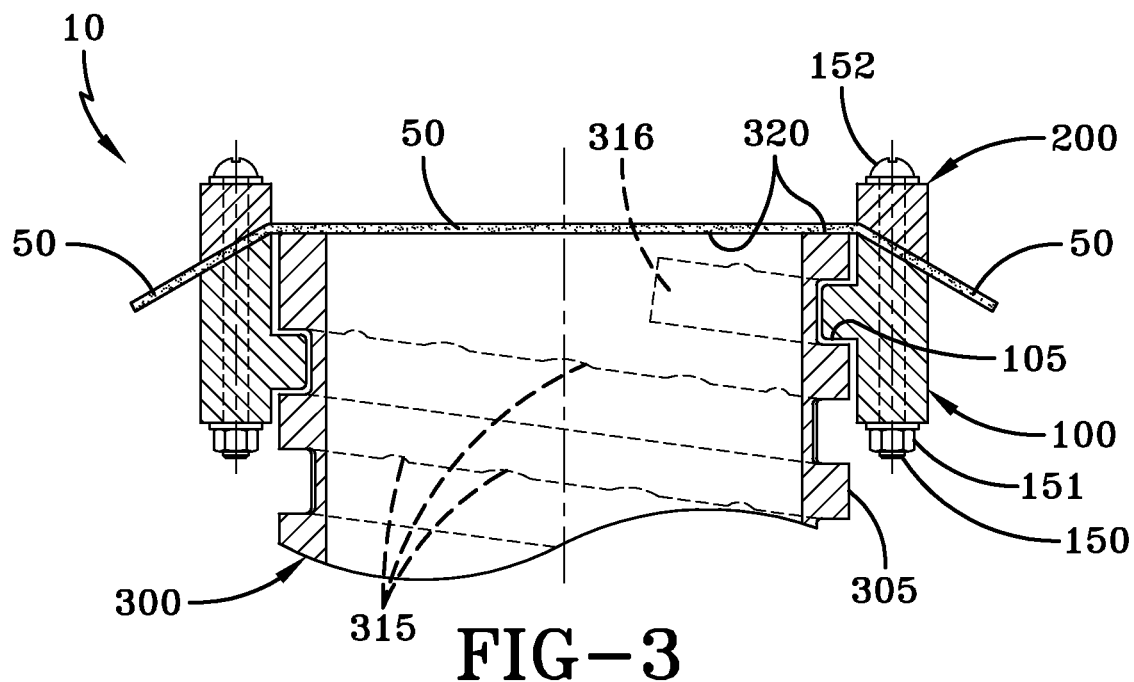
FIG. 3 is a side cross sectional view of the tensioning device for a sheet of material in operation; and, FIG. 4 is a top view of an embodiment of the tensioning device for a sheet of material.
Figure 4:
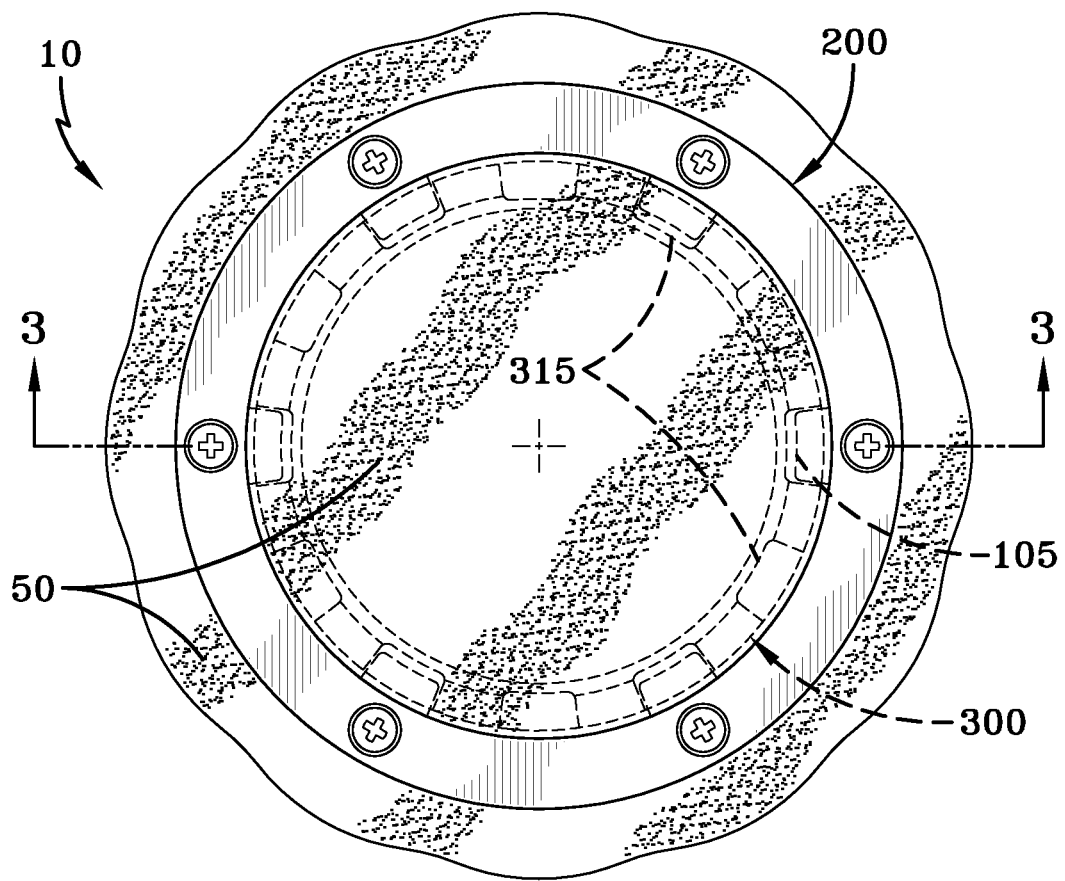

The preferred embodiments of the present invention are illustrated by way of example below and as shown in FIGS. 1-3. As shown in FIGS. 1, 2, and 3, the tensioning device for a sheet of material 10 includes a first ring 100 with protrusions 105 (cut out portion shown in FIG. 1), a second ring 200 (cut out portion shown in FIG. 1), and a shaft 300. The first ring 100 and the second ring 200 are positioned such that a sheet of material 50 can be clamped between the first ring 100 and the second ring 200. The shaft 300 has an outer surface 305 which includes a spiral race 310 such that the protrusions 105 of the first ring 100 follow, communicate, and correspond to the spiral race 310, allowing the first ring 100 and the second ring 200 to displace linearly, and causing the sheet of material 50 to be stretched. As shown in FIG. 2, the spiral race 310 also includes a plurality of notches 315 that correspond to the protrusions 105. The notches 315 provide repeatable tensions for the sheet of material 50.

In the description of the present invention, the invention will be discussed in an acoustic membrane metamaterial environment; however, this invention can be utilized for any type of application that requires stretching of a sheet of material.

In operation, the user applies petroleum jelly, or a similar substance, to the top 320 of the shaft 300. In the preferred embodiment, the top 320 is a rounded surface or a flat surface with rounded or filleted edges. The user then moves the first ring 100 to the top notch 316 by rotating the first ring 100 around the shaft 300 via the spiral race 310. The user may optionally place an object inside the shaft (support material) to help support the sheet of material 50. The user then places (preferably centers) the sheet of material 50 on the first ring 100 and over the top 320 of the shaft 300. The second ring 200 is then placed on top of the sheet 50 such that it corresponds to the first ring 100, such that both rings 100, 200 are axially aligned. The second ring 200 and the first ring 100 are then fastened or clamped together via a fastening apparatus 150 (a nut 151 and bolt 152 combination is shown in FIG. 1; however, any type of fastener practicable can be utilized). Once the sheet 50 is disposed between the rings 100, 200 and the rings 100, 200 are fastened together, the material is ready to be stretched and tension applied. The support material is then removed (if applicable), and the rings 100, 200 are rotated along the spiral race 310 such that the top 320 of the shaft 300 applies force on the sheet 50 and radially stretches the sheet 50. The rings 100, 200 can be pushed into the notch(es) 315 such that the protrusions 105 lock into the notches 315. The preferred method of stretching or tensioning is to stop rotating every 2-3 notches 315 in order to slide the sheet 50 circumferentially to ensure a uniform stretch. Once the desired stretch is obtained a ring or other device may be used to obtain the stretched material sample.

The tensioning device for a sheet of material 10 can be used to stretch a variety of materials such as, but without limitation, natural latex rubber. The tensioning device 10 can be manufactured from 3D printed ABS plastic, but can be constructed from any material practicable.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiments) contained herein.

What is claimed is:

1. A tensioning device for a sheet of material, comprising:
   a first ring with protrusions;
   a second ring, the first ring and the second ring positioned such that the sheet of material can be clamped between the first ring and the second ring;

a shaft having an outer surface, the surface including a spiral race such that the protrusions of the first ring follow the spiral race, allowing the first ring and the second ring to displace linearly causing the sheet of material to be stretched, the spiral race including a plurality of notches that correspond to the protrusions.

2. The tensioning device for a sheet of material of claim 1, wherein the first ring and the second ring are clamped via fasteners.

\* \* \* \* \*